(12) United States Patent
Jin

(10) Patent No.: US 9,985,471 B2
(45) Date of Patent: May 29, 2018

(54) MOBILE TERMINAL AND CONTROL METHOD FOR BATTERY THEREOF

(71) Applicant: ZTE CORPORATION, Shenzhen, Guangdong Province (CN)

(72) Inventor: Anan Jin, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 596 days.

(21) Appl. No.: 14/419,917

(22) PCT Filed: Aug. 6, 2013

(86) PCT No.: PCT/CN2013/080930
§ 371 (c)(1),
(2) Date: Feb. 5, 2015

(87) PCT Pub. No.: WO2014/023224
PCT Pub. Date: Feb. 13, 2014

(65) Prior Publication Data
US 2015/0194844 A1    Jul. 9, 2015

(30) Foreign Application Priority Data
Aug. 10, 2012    (CN) .......................... 2012 1 0284961

(51) Int. Cl.
*H02J 7/00*    (2006.01)
*H02J 9/06*    (2006.01)
*H02J 7/34*    (2006.01)

(52) U.S. Cl.
CPC ............ *H02J 9/061* (2013.01); *H02J 7/0052* (2013.01); *H02J 7/34* (2013.01); *Y10T 307/344* (2015.04); *Y10T 307/625* (2015.04)

(58) Field of Classification Search
USPC .......................................................... 307/23
See application file for complete search history.

(56) References Cited

U.S. PATENT DOCUMENTS

2005/0162132 A1 * 7/2005 Nagasawa ............... H02J 9/061
                                                                    320/128
2007/0285056 A1   12/2007 Yoon et al.

FOREIGN PATENT DOCUMENTS

CN            2694506           4/2005
CN          201282451    *      7/2009
(Continued)

OTHER PUBLICATIONS

International Search Report (Form PCT/ISA/210) for PCT/CN2013/080930 dated Nov. 14, 2013.
(Continued)

*Primary Examiner* — Hal Kaplan
*Assistant Examiner* — Xuan Ly
(74) *Attorney, Agent, or Firm* — Koppel, Patrick, Heybl & Philpott

(57) ABSTRACT

The disclosure provides a mobile terminal and a method for controlling a battery thereof, wherein the mobile terminal includes: a main battery configured to supply power to the mobile terminal, a standby battery and a control device. Wherein the control device is configured to switch on the standby battery to supply power to the mobile terminal when the mobile terminal loses the enough power provided to the mobile terminal by the main battery. With the disclosure, a mobile terminal is allowed to be powered by a standby battery when a main battery fails to supply power, which avoids the inconvenience caused by lower battery power and improves the user experience of the mobile terminal.

11 Claims, 3 Drawing Sheets

(56) References Cited

FOREIGN PATENT DOCUMENTS

| | | |
|---|---|---|
| CN | 201282451 Y | 7/2009 |
| CN | 101771293 A | 7/2010 |
| CN | 202026128 U | 2/2011 |
| CN | 102394508 * | 3/2012 |
| CN | 102394508 A | 3/2012 |
| JP | H0645979 | 2/1994 |
| JP | 2002374326 | 12/2002 |
| JP | 2007325086 | 12/2007 |
| JP | 2007329808 | 12/2007 |
| TW | 490909 | 6/2002 |

OTHER PUBLICATIONS

Supplementary European Search Report, Application No. EP13827446, dated Jul. 29, 2015.

* cited by examiner

MOBILE TERMINAL AND CONTROL METHOD FOR BATTERY THEREOF

TECHNICAL FIELD

The disclosure relates to the field of communications, and in particular to a mobile terminal and a control method for a battery thereof.

BACKGROUND

The popularization of mobile terminals brings infinite convenience and fun to our life. Mobile terminals such as smart phones and tablet PCs can be seen everywhere, and their functions become more and more powerful as the development of society. For example, shopping, doing business, buying and selling shares, playing games and watching films can all be done on a mobile terminal.

However, the powerful application function also brings a drawback to mobile terminals, that is, the standby time of mobile terminals is relatively short. Often at a very critical moment low battery occurs and the mobile terminals would prompt low battery at this moment, therefore, in order to work or entertain more fluently, the batteries have to be replaced. However, the replacement of battery would lead to temporary service interruption of mobile terminals. Furthermore, present smart terminals are generally slow to power on and power off.

In today's fast-paced society, a few minutes consumed by power-on and power-off due to the replacement of battery might bring much inconvenience to our life. For example, during the time of doing business or buying and selling shares, the interruption of a few minutes probably brings us a great loss. In addition, during a call, the call interruption caused by mobile terminal shutdown due to low battery also leads to a poor user experience of the mobile terminal.

Therefore, while improving battery capacity of mobile terminals, it is also needed to eliminate the anxiety brought by the service interruption of mobile terminals caused by mobile terminal shutdown due to low battery and the time consumption of power-on and power-off needed during the battery replacement, so as to make the mobile terminals work normally while batteries are replaced.

Aiming to the problem of service interruption of mobile terminals caused by low battery and the replacement of battery in related art, no solution has been put forward.

SUMMARY

In view of the problem of mobile terminal service interruption existing in related art caused by low power of the mobile terminal and replacement of battery, the embodiments of the disclosure provide a mobile terminal and a control method for a battery thereof to resolve the above problem.

According to one embodiment of the disclosure, a mobile terminal is provided, including: a main battery configured to supply power to the mobile terminal, a standby battery and a control device, wherein the control device is configured to switch on the standby battery to supply power to the mobile terminal when the mobile terminal loses enough power provided to the mobile terminal by the main battery.

In the described embodiment, the control device includes: a first elastic switch and a second elastic switch, wherein the main battery is connected to the mobile terminal through the first elastic switch and the standby battery is connected with the second elastic switch; when the main battery supplies power to the mobile terminal, the first elastic switch keeps contracted, and the second elastic switch and the first elastic switch are separated; during a process of the main battery being taken out of the mobile terminal, the first elastic switch expands to contact the second elastic switch to switch on the standby battery, enabling the main battery and the standby battery to supply power to the mobile terminal simultaneously; after the main battery has been taken out of the mobile terminal, the first elastic switch keeps in contact with the second elastic switch and the standby battery supplies power to the mobile terminal.

In the described embodiment, the control device includes: a detection component, configured to detect the power supplying condition of the main battery; a control component, configured to switch on the standby battery to supply power to the mobile terminal when the detection component detects that the power supplying condition meets a preset condition.

In the described embodiment, the standby battery is connected to a first pin of the mobile terminal, wherein the first pin is used for transferring power to the standby battery when charging the standby battery.

In the described embodiment, the first pin is a pin which transfers power to the main battery when charging the main battery.

In the described embodiment, the standby battery is located in the downside of a battery slot of the main battery.

According to another embodiment of the disclosure, a control method for a battery is provided, applied to a mobile terminal including a main battery and a standby battery and includes: the mobile terminal detecting a power supplying condition of the main battery; when detecting that the power supplying condition meets a preset condition, the mobile terminal switching on the standby battery to supply power to the mobile terminal.

In the described embodiment, the method further includes: in a condition that the power supplying condition does not meet the preset condition, the mobile terminal switching on the main battery to supply power to the mobile terminal.

In the described embodiment, when detecting that the power supplying condition meets the preset condition, the method further includes: the mobile terminal generating a prompt message, wherein the prompt message is used for prompting a user to replace the main battery.

Through the embodiments of disclosure, a mobile terminal is provided, which includes a main battery configured to supply power to the mobile terminal, a standby battery and a control device, wherein the control device is configured to switch on the standby battery to supply power to the mobile terminal when the mobile terminal loses enough power provided to the mobile terminal by the main battery, thus, the mobile terminal is powered by the standby battery when the main battery fails to supply power, which avoids the inconvenience caused by lower battery power, particularly avoids the problem of service interruption caused by not replacing battery timely and avoids the time consumption of power-on and power-off needed by the replacement of battery, thereby improving the user experience of the mobile terminal.

BRIEF DESCRIPTION OF THE DRAWINGS

For further understanding of the disclosure, accompanying drawings described hereinafter are provided to constitute one part of the application. The schematic embodiments of the disclosure and the description thereof are used to illustrate the disclosure, but not to limit the disclosure improperly. In the accompanying drawings.

DETAILED DESCRIPTION OF THE EMBODIMENTS

The disclosure is described below in detail by reference to the accompanying drawings in conjunction with embodiments. It should be noted that the embodiments in the application and the characteristics of the embodiments may be combined if no conflict is caused.

According to an embodiment of the disclosure, a mobile terminal is provided, and a standby battery is added in the mobile terminal. The mobile terminal is powered by the standby battery when the mobile terminal loses enough power provided by a main battery so as to avoid the problem of service interruption of the mobile terminal caused by low battery and replacement of battery.

Figure 1:
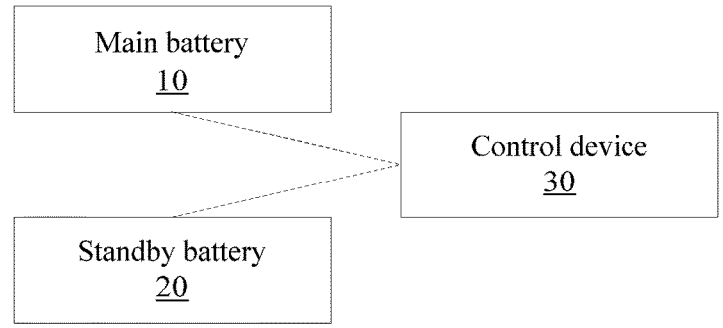
FIG. 1 shows a schematic diagram of a mobile terminal according to the embodiment of the disclosure.

FIG. 1 shows a schematic diagram of a mobile terminal according to the embodiment of the disclosure. As shown in FIG. 1, the mobile terminal mainly includes: a main battery 10 configured to supply power to the mobile terminal, a standby battery 20 and a control device 30, wherein the control device 30 is configured to switch on the standby battery 20 to supply power to the mobile terminal when the mobile terminal loses enough power provided to the mobile terminal by the main battery 10.

Through the embodiment of the disclosure, a mobile terminal is provided, which includes: a main battery 10 configured to supply power to the mobile terminal, a standby battery 20 and a control device 30, wherein the control device 30 is configured to switch on the standby battery 20 to supply power to the mobile terminal when the mobile terminal loses enough power provided to the mobile terminal by the main battery 10. Thus, the mobile terminal may be powered by the standby battery when the main battery fails to supply power, which avoids the inconvenience caused by lower battery power, particularly avoids the problem of service interruption caused by not replacing battery timely and the time consumption of power-on and power-off needed by the replacement of battery, thereby improving the user experience of the mobile terminal.

In the following example embodiments of the disclosure, the above-mentioned mobile terminal is described by respectively taking the control device function realized by hardware circuits and software control mode as an example.

Example Embodiment 1

Figure 2:
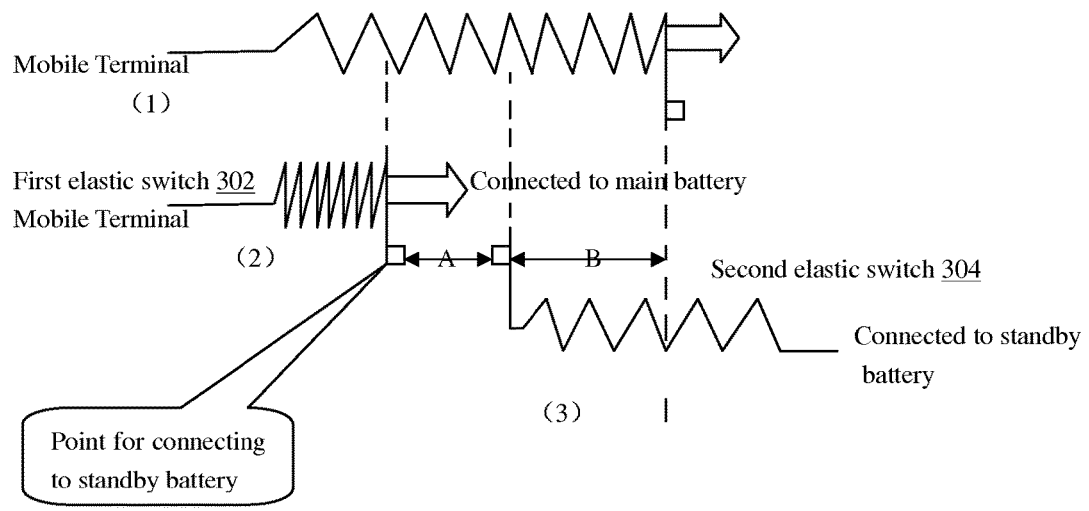
FIG. 2 shows a schematic diagram of the structure and state conversion of a control device according to an example Embodiment 1 of the disclosure.
Figure 2:
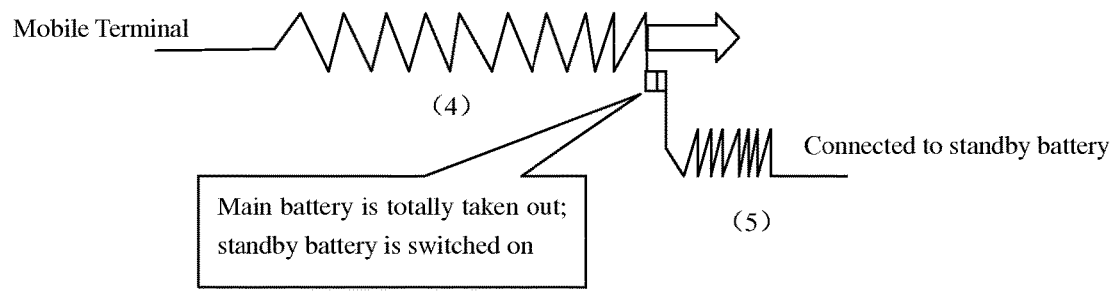

In the example Embodiment 1 of the disclosure, as shown in FIG. 2, the control device 30 may include: a first elastic switch 302 and a second elastic switch 304, wherein the main battery 10 is connected to the mobile terminal through the first elastic switch 302 and the standby battery 20 is connected with the second elastic switch 304.

FIG. 2 shows a state conversion process between the first elastic switch 302 and the second elastic switch 304 of the mobile terminal. As shown in FIG. 2, the replacement of battery includes processes specifically described as follows.

Figure 3:
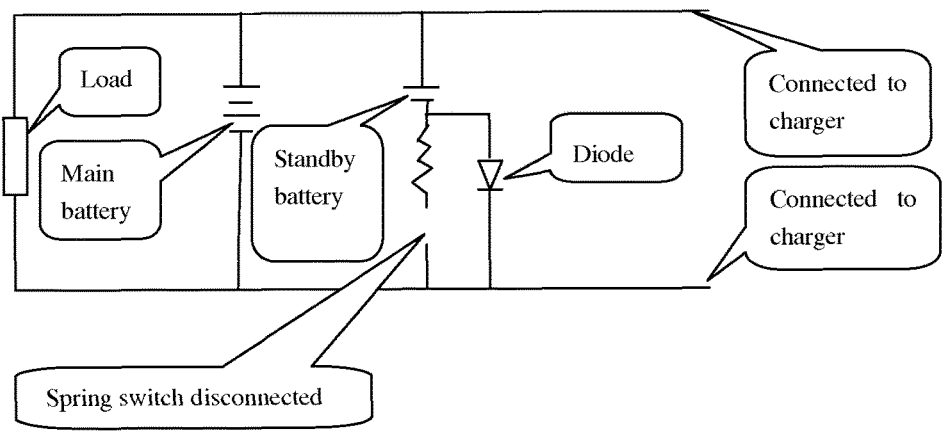
FIG. 3 shows a schematic diagram of a power supply circuit in which the main battery supplies power and the standby battery is disconnected according to the embodiment of the disclosure.

1) When the main battery 10 supplies power to the mobile terminal, the first elastic switch 302 keeps contracted, and the second elastic switch 304 and the first elastic switch 302 are separated. FIG. 3 shows a schematic diagram of a power supply circuit in which the main battery supplies power and the standby battery is disconnected according to the embodiment of the disclosure. As shown in FIG. 3, the first elastic switch 302 and the second elastic switch 304 are in the state A shown in FIG. 2. In this state, the main battery 10 is connected with a load, the second elastic switch 304 connected with the standby battery 20 is disconnected and the standby battery 20 does not supply power to the mobile terminal.

Figure 4:
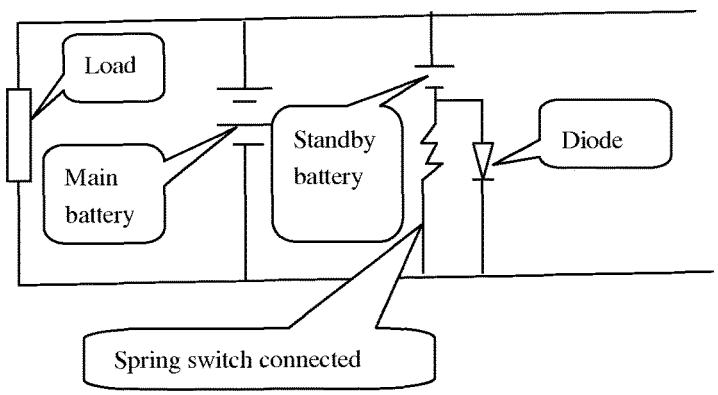
FIG. 4 shows a schematic diagram of a power supply circuit in which both the main battery and the standby battery supply power simultaneously according to the embodiment of the disclosure.

2) During the process of the main battery 10 being taken out of the mobile terminal, the first elastic switch 302 expands to contact the second elastic switch 304 to switch on the standby battery 20, thereby enabling the main battery 10 and the standby battery 20 to supply power to the mobile terminal simultaneously. FIG. 4 shows a schematic diagram of a power supply circuit in which both the main battery and the standby battery supply power simultaneously according to the embodiment of the disclosure. As shown in FIG. 4, the first elastic switch 302 and the second elastic switch 304 are in the state B shown in FIG. 2. In this state, the second elastic switch 304 connected with the standby battery 20 contacts with the first elastic switch 302 connected with the main battery 10, at this time, the main battery 10 and the standby battery 20 supply power to the mobile terminal simultaneously.

Figure 5:
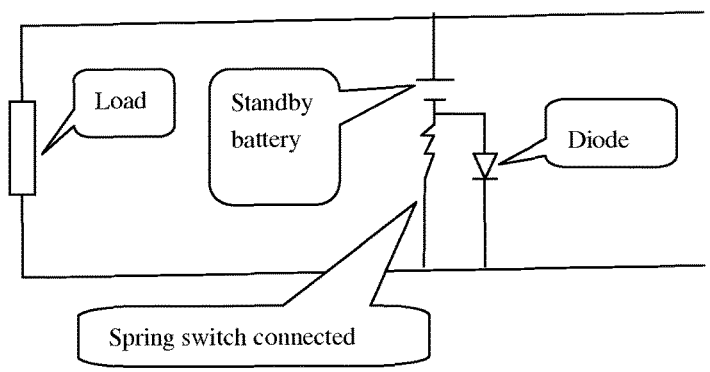
FIG. 5 shows a schematic diagram of a power supply circuit in which the main battery is disconnected and the standby battery supplies power according to the embodiment of the disclosure.

3) After the main battery 10 has been taken out of the mobile terminal, the first elastic switch 302 keeps in contact with the second elastic switch 304 so that the standby battery 20 can supply power to the mobile terminal. FIG. 5 shows a schematic diagram of a power supply circuit in which the main battery is disconnected and the standby battery supplies power according to the embodiment of the disclosure. As shown in FIG. 5, after the main battery 10 has been taken out of the mobile terminal, the second elastic switch 304 connected with the standby battery 20 keeps contacted with the first elastic switch 302 connected with the main battery 10, at this time only the standby battery supplies power to the mobile terminal.

As shown in FIG. 3 to FIG. 5, a diode may be set in a parallel connection with the first elastic switch 302 and the second elastic switch 304 to prevent the standby battery and the main battery from supplying power to the mobile terminal simultaneously when the terminal works normally, thereby ensuring the reliability and stability of the circuit and avoiding electric energy waste of the standby battery 20. When the terminal is normally charged, the standby battery is switched on so that the battery charger can charge the main and standby batteries simultaneously.

During specific implementation, the standby battery 20 and the main battery 10 may be connected with the mobile terminal through a spring switch. The standby battery 20 may be connected with a PIN terminal (the elastic switch connected with the main battery, that is, the first elastic switch 302) of the mobile terminal through a wire and a spring switch (that is, the second elastic switch 304), to form a power supply circuit.

When the main battery 10 is taken out, the spring switch expands so that the mobile terminal is connected with the standby battery, as shown in FIG. 2. A range (section B), in which the main battery 10 and the standby battery 20 are ensured to be connected with the mobile terminal simultaneously, may be set for the connection of the spring switch and the mobile terminal, so as to avoid the occurrence that the standby battery 20 has not been connected to the mobile terminal when the main battery 10 stops supplying power to the mobile terminal, that is, in section B shown in FIG. 2, the main battery 10 and the standby battery 20 supply power to the terminal simultaneously. After the main battery 10 is installed, the spring switch of the standby battery 20 is disconnected and the standby battery 20 no longer supplies power to the mobile terminal.

Through this example embodiment, when a mobile terminal prompts low battery and the user needs to replace a battery while a user is using the mobile terminal (for example, in a call or a stock exchange), it is only needed to pull out the main battery, then the standby battery can continue to supply power to the mobile terminal. Through a simple circuit design, the problem that the mobile terminal needs to be powered off and then powered on during the replacement of battery is avoided, people can use mobile terminals more fluently and user experience of mobile terminals is improved.

Example Embodiment 2

Figure 6:
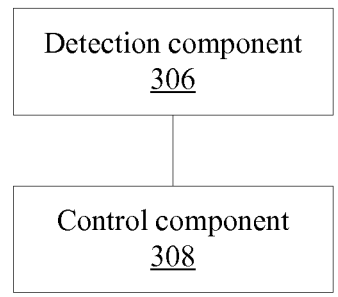
FIG. 6 shows a structure diagram of a control device according to an example Embodiment 2 of the disclosure.

In the example Embodiment 2 of the disclosure, as shown in FIG. 6, the control device 30 may include: a detection component 306 and a control component 308, wherein the detection component 306 is configured to detect the power supplying condition of the main battery 10; the control component 308 is coupled with the detection component 306 and is configured to switch on the standby battery 20 to supply power to the mobile terminal when the detection component 306 detects that the power supplying condition of the main battery 10 meets a preset condition.

Through the example embodiment of the disclosure, the detection component 306 detects the power supplying condition of the main battery 10. When the detection component 306 detects that the power supplying condition of the main battery 10 meets a preset condition, the control component 308 switches on the standby battery 20 to supply power to the mobile terminal. In this way, automatic switch of mobile terminal batteries is realized, the problem of service interruption caused by not replacing battery timely when the main battery loses enough power is avoided, and user experience of the mobile terminal is improved.

In practical application, the state of the standby battery 20 and the state of the main battery 10 may be exchanged. That is, one of the two batteries is used as the main battery and the other one is used as the standby battery in the mobile terminal. At this time, in order to guarantee the standby time of the mobile terminal, the main battery 10 and the standby battery 20 may be provided with the same power capacity.

Figure 7:
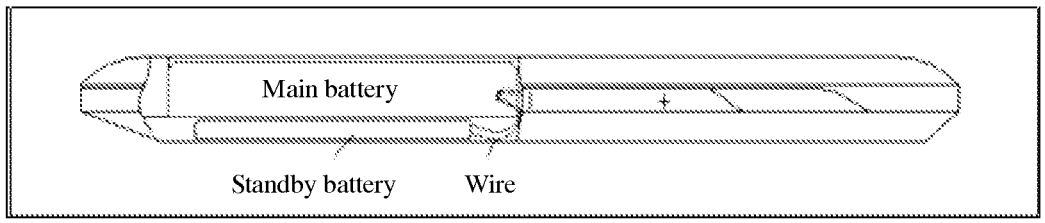
FIG. 7 shows a schematic diagram of the location of the standby battery according to the example embodiment of the disclosure.

In addition, the standby battery 20 may be embedded in the mobile terminal to supply power to the mobile terminal for a short time. For example, as shown in FIG. 7, the standby battery 20 may be embedded in the downside of a battery slot; however, the embodiment of the disclosure is not limited to this position.

In order to ensure the lasting power supplying of the standby battery 20, in an example embodiment of the disclosure, the standby battery 20 may be connected to a first pin of the mobile terminal, wherein the first pin is used for transferring power to the standby battery when charging the standby battery. In an example embodiment, as shown in FIG. 3, the first pin may be a pin which transfers power to the main battery while charging the main battery. When a battery charger is plugged in, the mobile terminal, the main battery 10 and the standby battery 20 may both act as a receiver to receive the power transferred from the battery charger, the main battery 10 and the standby battery 20 store power simultaneously.

According to the embodiment of the disclosure, a control method for a battery is provided, which is used to realize the switch of battery in the mobile terminal provided in the example Embodiment 2 of the disclosure.

Figure 8:
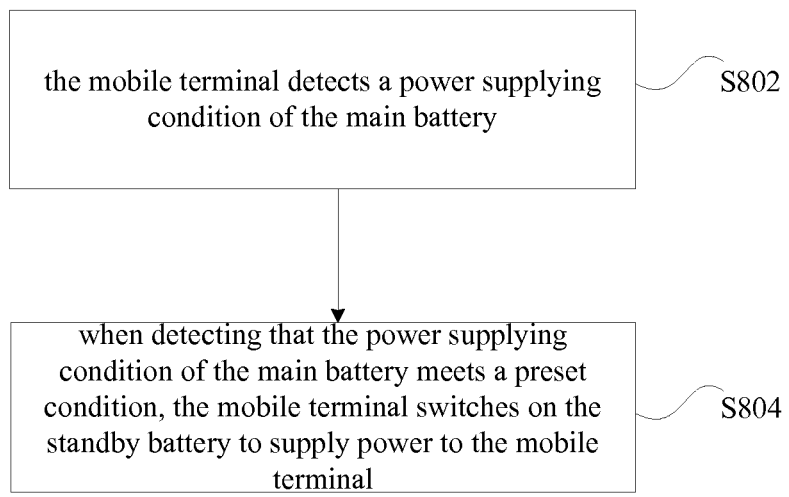
FIG. 8 shows a flowchart of a control method for a battery according to the embodiment of the disclosure.

FIG. 8 shows a flowchart of a control method for a battery according to the embodiment of the disclosure. As shown in FIG. 8, the method mainly includes steps S802 to S804 which are specifically described as follows.

Step S802: the mobile terminal detects a power supplying condition of the main battery.

Step S804: when detecting that the power supplying condition of the main battery meets a preset condition, the mobile terminal switches on the standby battery to supply power to the mobile terminal.

Through the embodiment of the disclosure, the mobile terminal detects the power supplying condition of the main battery and switches on the standby battery to supply power to the mobile terminal when detecting that the power supplying condition of the main battery meets the preset condition. Thus, the mobile terminal may be powered by the standby battery when the main battery fails to supply power, which avoids the inconvenience caused by lower battery power, particularly avoids the problem of service interruption caused by not replacing battery timely and avoids the time consumption of power-on and power-off needed by the replacement of battery, thereby improving the user experience of the mobile terminal.

In an example embodiment of the disclosure, the state of the main battery and the state of the standby battery may be exchanged. In the condition that the power supplying condition of the standby battery does not meet the preset condition, the mobile terminal may switch on the main battery to supply power to the mobile terminal.

In the example embodiment, when detecting that the power supplying condition of the main battery meets the preset condition, the mobile terminal may further generate a prompt message, wherein the prompt message is used for prompting a user to replace the main battery.

From the above-mentioned description, it may be seen that the disclosure achieves following technical effects. The embodiment of the disclosure provides a mobile terminal, which includes a main battery 10 configured to supply power to the mobile terminal, a standby battery 20 and a control device 30, wherein the control device 30 is configured to switch on the standby battery 20 to supply power to the mobile terminal when the mobile terminal loses enough power provided to the mobile terminal by the main battery 10. Thus, the mobile terminal may be powered by the standby battery when the main battery fails to supply power, which avoids the inconvenience caused by lower battery power, particularly avoids the problem of service interruption caused by not replacing battery timely and avoids the time consumption of power-on and power-off needed by the replacement of battery, thereby improving the user experience of the mobile terminal.

Obviously, those skilled in the art shall understand that the above-mentioned components or steps of the disclosure can be realized by using general purpose calculating device, can be integrated in one calculating device or distributed on a network which consists of a plurality of calculating devices. Alternatively, the components or the steps of the disclosure can be realized by using the executable program code of the calculating device. Consequently, they can be stored in the storing device and executed by the calculating device and the shown and described steps may be executed in an order which is different here in some cases, or the components or the steps of the disclosure are made into integrated circuit component respectively, or a plurality of components or steps thereof are made into one integrated circuit component. In this way, the disclosure is not restricted to any particular hardware and software combination.

The descriptions above are only the example embodiments of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A mobile terminal, comprising: a main battery configured to supply power to the mobile terminal, a standby battery and a control device, wherein
   the control device is configured to switch on the standby battery to supply power to the mobile terminal when the mobile terminal loses enough power provided to the mobile terminal by the main battery;
   wherein the standby battery is connected to a first pin of the mobile terminal, wherein the first pin is used for transferring power to the standby battery when charging the standby battery.

2. The mobile terminal according to claim 1, wherein the control device comprises: a first elastic switch and a second elastic switch, wherein the main battery is connected to the mobile terminal through the first elastic switch and the standby battery is connected with the second elastic switch;
   when the main battery supplies power to the mobile terminal, the first elastic switch keeps contracted, and the second elastic switch and the first elastic switch are separated;
   during a process of the main battery being taken out of the mobile terminal, the first elastic switch expands to contact the second elastic switch to switch on the standby battery, enabling the main battery and the standby battery to supply power to the mobile terminal simultaneously;
   after the main battery has been taken out of the mobile terminal, the first elastic switch keeps in contact with the second elastic switch and the standby battery supplies power to the mobile terminal.

3. The mobile terminal according to claim 1, wherein the control device comprises:
   a detection component, configured to detect a power supplying condition of the main battery;
   a control component, configured to switch on the standby battery to supply power to the mobile terminal when the detection component detects that the power supplying condition meets a preset condition.

4. The mobile terminal according to claim 1, wherein the first pin is a pin which transfers power to the main battery when charging the main battery.

5. The mobile terminal according to claim 1, wherein the standby battery is located in the downside of a battery slot of the main battery.

6. A control method for a battery, applied to a mobile terminal comprising a main battery and a standby battery, comprising:
   the mobile terminal detecting a power supplying condition of the main battery;
   when detecting that the power supplying condition meets a preset condition, the mobile terminal switching on the standby battery to supply power to the mobile terminal;
   wherein the standby battery is connected to a first pin of the mobile terminal, wherein the first pin is used for transferring power to the standby battery when charging the standby battery.

7. The method according to claim 6, further comprising:
   in a condition that the power supplying condition does not meet the preset condition, the mobile terminal switching on the main battery to supply power to the mobile terminal.

8. The method according to claim 6, wherein when detecting that the power supplying condition meets the preset condition, the method further comprises:
   the mobile terminal generating a prompt message, wherein the prompt message is used for prompting a user to replace the main battery.

9. The mobile terminal according to claim 2, wherein the standby battery is located in the downside of a battery slot of the main battery.

10. The mobile terminal according to claim 3, wherein the standby battery is located in the downside of a battery slot of the main battery.

11. The method according to claim 7, wherein when detecting that the power supplying condition meets the preset condition, the method further comprises:
    the mobile terminal generating a prompt message, wherein the prompt message is used for prompting a user to replace the main battery.

* * * * *